United States Patent [19]

Sheppard

[11] 3,995,356
[45] Dec. 7, 1976

[54] VALVE SYSTEM
[75] Inventor: William L. Sheppard, Romulus, Mich.
[73] Assignee: AVM Corporation, Jamestown, N.Y.
[22] Filed: Mar. 11, 1974
[21] Appl. No.: 450,004

Related U.S. Application Data

[60] Division of Ser. No. 195,631, Nov. 4, 1971, Pat. No. 3,805,522, which is a continuation-in-part of Ser. No. 126,182, March 19, 1971, abandoned.

[52] U.S. Cl. ............................ 29/157 R; 29/407; 29/525; 138/40
[51] Int. Cl.² .................. B23P 15/00; B23P 19/02
[58] Field of Search ............... 29/157 C, 525, 407, 29/157 R; 239/546, 517; 72/377; 138/40, 44

[56] References Cited
UNITED STATES PATENTS

| | | | |
|---|---|---|---|
| 733,618 | 7/1903 | Brachhausen | 239/546 |
| 851,603 | 4/1907 | Long | 239/546 |
| 1,832,380 | 11/1931 | Goldman | 138/40 |
| 2,294,398 | 9/1942 | Ferguson | 29/525 |
| 2,468,824 | 5/1949 | Hughey | 29/157 C |
| 2,894,740 | 7/1959 | Emerson et al. | 267/123 |
| 3,418,012 | 12/1968 | Torre | 29/525 |
| 3,641,802 | 2/1972 | Segro | 29/157 C |
| 3,729,792 | 5/1973 | Goss | 29/157 C |

*Primary Examiner*—C.W. Lanham
*Assistant Examiner*—Dan C. Crane
*Attorney, Agent, or Firm*—Harness, Dickey & Pierce

[57] ABSTRACT

An air diverter valve for selectively diverting the output of an air pump in a vehicular emission control system from a combustion system to a diversion system, in response to each or all of a variety of system conditions including abrupt rise in intake manifold vacuum, continuing low intake manifold vacuum, continuing high intake manifold vacuum, or overtemperature conditions, and for controlling the duration of the diversion.

9 Claims, 13 Drawing Figures

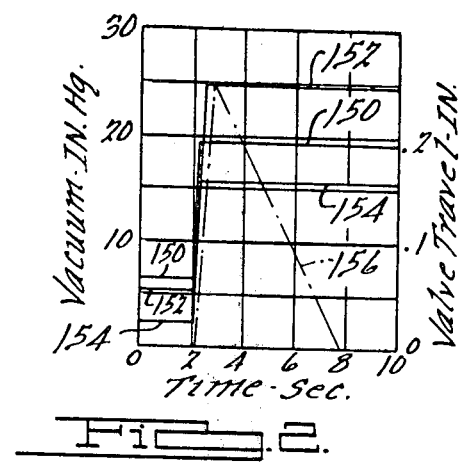
Fig. 2.
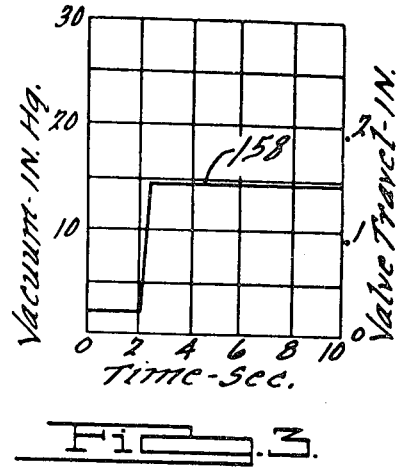
Fig. 3.
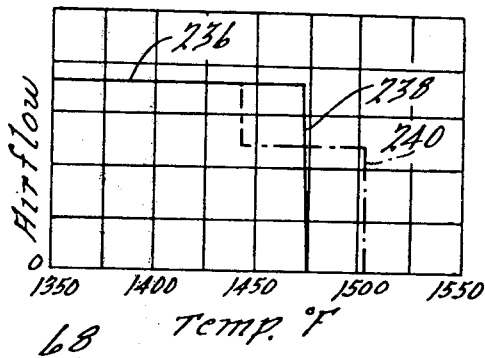
Fig. 4.
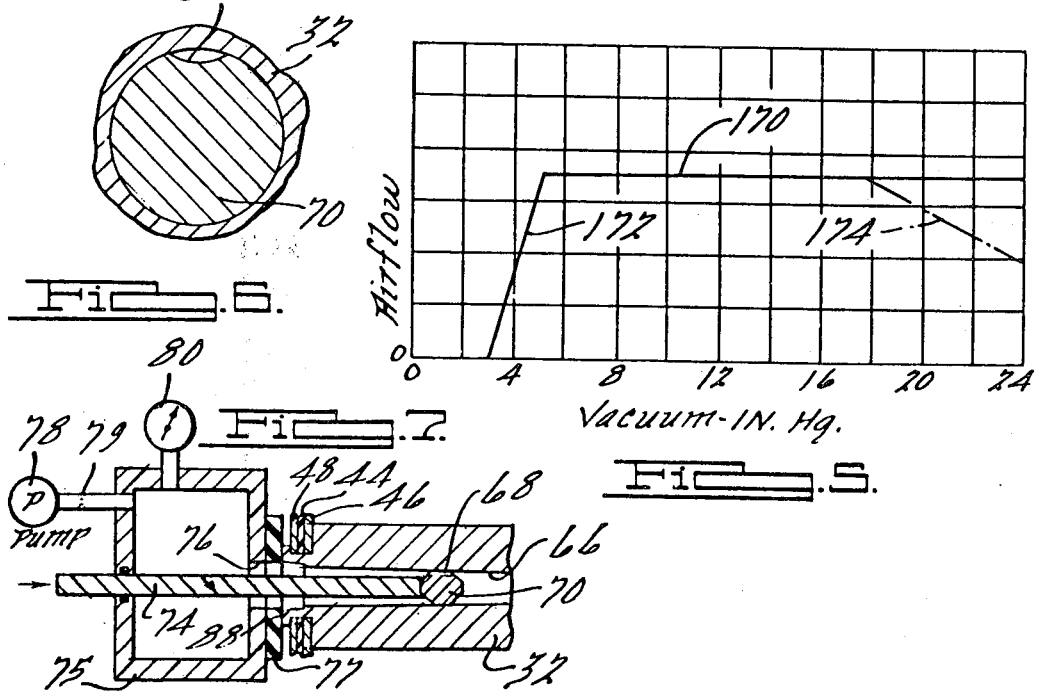
Fig. 6.
Fig. 7.
Fig. 5.

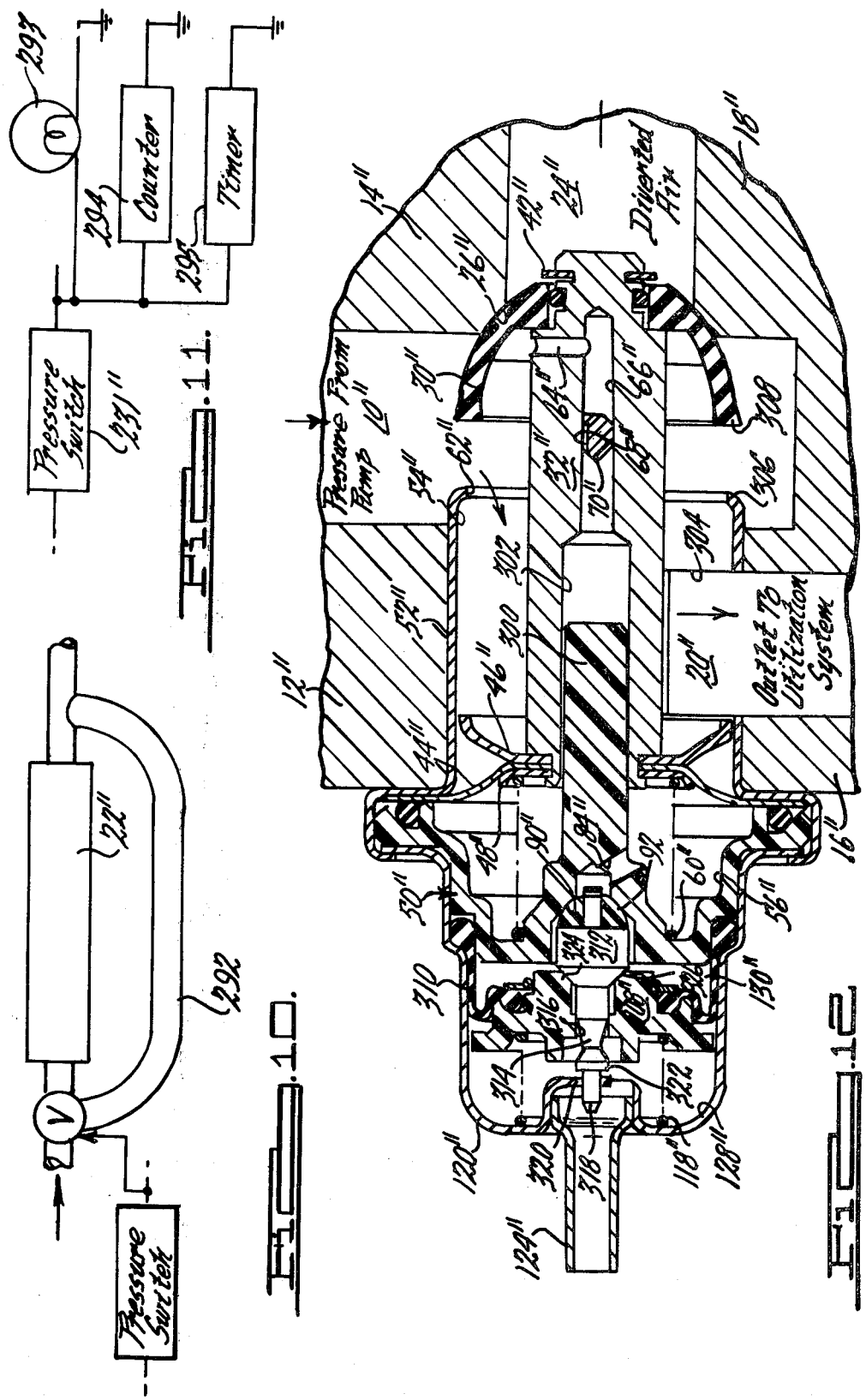

VALVE SYSTEM

This is a divisional of application Ser. No. 195,631, filed Nov. 4, 1971, now Pat. No. 3,805,522, which in turn is a continuation-in-part of application Ser. No. 126,182, filed Mar. 19, 1971 and now abandoned.

SUMMARY OF THE INVENTION

In order to reduce undesirable vehicular exhaust emissions, and particularly the emission of unburned hydrocarbons, automobile manufacturers have utilized systems for injecting fresh air into the exhaust systems of internal combustion engines to produce additional combustion of the unburned hydrocarbons emitted through the exhaust valves of the engine. In one such system, for example, (the so-called injector reactor system used by General Motors Corporation), an air pump drives fresh air, under pressure, through air manifolds, hoses and injection tubes into the exhaust system of the internal combustion engine in the area of the exhaust valves. A diverter valve, sensing and operated by the intake manifold vacuum of the engine, responds to a sharp increase in manifold vacuum diverts the pump's output air flow from the utilization system (here, the exhaust system) to atmosphere (through a muffler) to prevent backfiring during this period of richer mixture.

The present valve is designed to better perform that function, as well as other functions.

In addition, similar air pumping systems will likely be used in conjunction with so-called catalytic converters or other supplementary combustion systems used in lieu of or supplemental to the vehicle's muffler to provide the fresh air necessary for the additional combustion of output exhaust products from the engine, and those systems will likely also utilize a diverter valve to selectively divert the pump air from the utilization system (here, the combustion device such as the catalytic converter or other system) to a diversion system, which may be, for example, exhaust to atmosphere, or to the inflow port of the pump itself. Again, the present valve is designed to perform that function under each or all of a variety of system conditions.

THE DRAWINGS

FIG. 1A is a fragmentary cross-sectional view of an auxiliary valve element which may be substituted for or used additionally to a portion of the system of FIG. 1;

FIG. 2 is a series of curves reflecting the operation of the device of FIG. 1 under certain operating conditions;

FIG. 3 is a curve illustrating a system condition in which the valve of FIG. 1 does not operate;

FIG. 4 is a curve reflecting the operation of the valve of FIG. 1 under certain overtemperature conditions;

FIG. 5 is a curve illustrating the operation of the valve of FIG. 1 under either or both of certain extreme intake manifold pressure conditions;

FIG. 6 is a cross-sectional view taken along the line 6—6 of FIG. 1;

FIG. 7 is a view illustrating a method of assembling a portion of the valve of FIG. 1 to achieve uniformity of product;

FIG. 10 is a schematic representation of a modification of the system of FIG. 9;

FIG. 11 is a schematic representation of a further modification of the system of FIG. 9; and FIG. 12 is a cross-sectional view, partially fragmentary, of a modified diverter valve.

DESCRIPTION OF THE PREFERRED EMBODIMENT OF THE INVENTION

Figure 1:
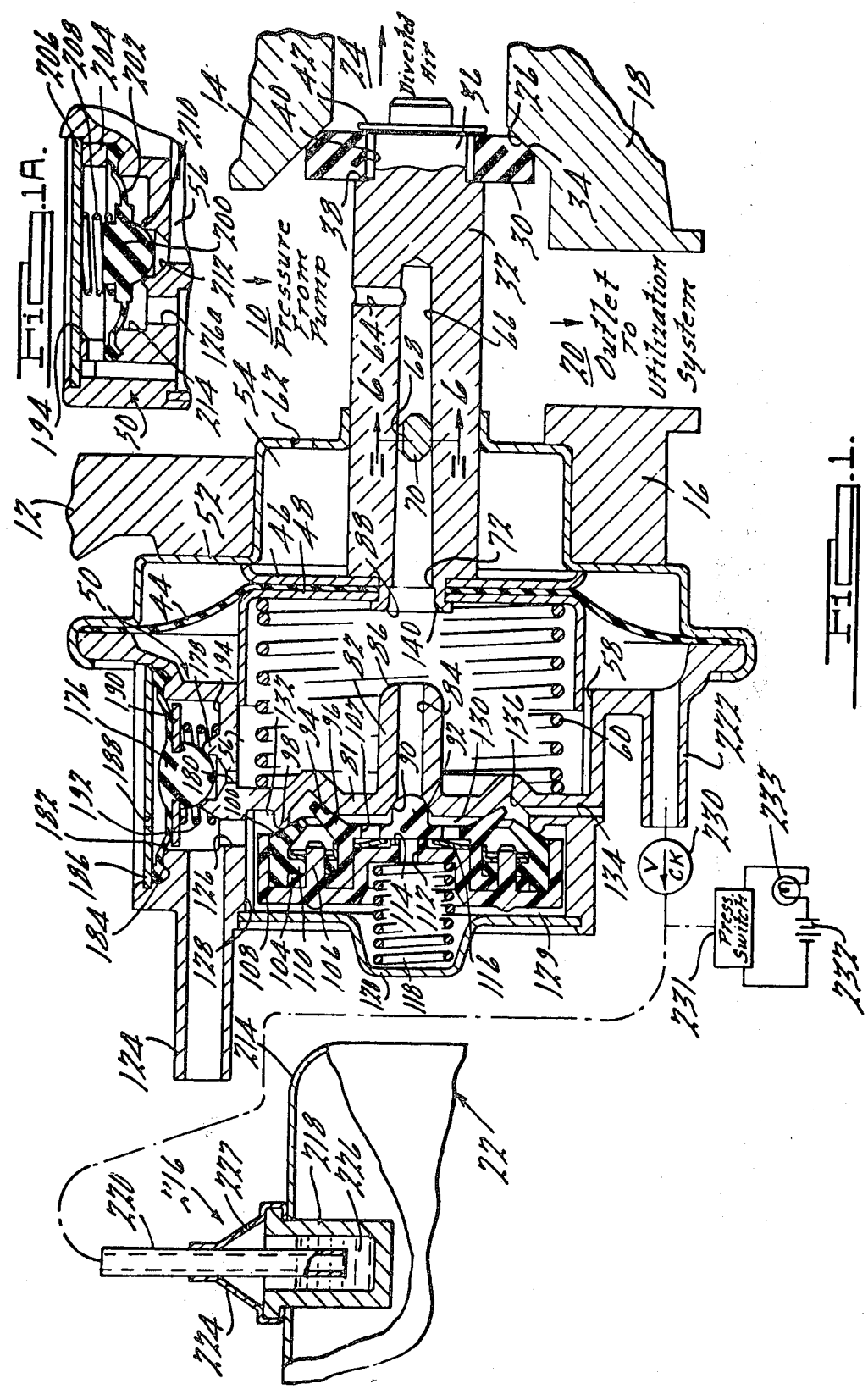
FIG. 1 is a cross-sectional view, partially fragmentary, of a diverter valve system embodying the principles of the present invention.

The valve system of FIG. 1 is illustrated in association with, and includes, elements of a positive air pressure generating system, such as a pump, having an outflow port 10 defined by housing elements 12, 14, 16 and 18, all of which are normally integral and may be elements of the pump housing itself or elements of a conduit from the pump. Air from port 10 normally flows through port 20 to the utilization device or system, such as the exhaust system of the vehicle, or the catalytic converter 22. A diversion port 24 (illustrated to be formed in the housing elements 14 and 18) may extend to atmosphere or back to the input or suction port of the pump. Diversion port 24 is illustrated to have a conical valve seat 26 at its entrance which is illustrated to be engaged by a valve 30 mounted on a valve stem 32. When valve 30 is closed, as illustrated, the pump air flow is through outlet 20 to the utilization device. When valve 30 is opened (moved to the left in the view of FIG. 1) the major air flow from the pump is diverted through port 24 since the impedance to air flow through that port is small relative to the impedance to air flow through port 20 and through the utilization device, particularly if port 24 is connected to the input of the pump. Accordingly, it is not essential that movement of the valve stem 32 also move another valve into sealing engagement with output port 20, although such can be done if desired.

When valve stem 32 moves to the right to bring valve 30 into sealing engagement with seat 26, problems of sealing and problems of alignment between the longitudinal axis of movement of stem 32 and the central axis of valve seat 26 can occur with an economically priced system. Accordingly two things are done. First, the sealing surface 34 of valve 30 is desirably a spherical surface (formed on a radius) to provide line sealing contact with the conical seat 26. Secondly, valve 30 is mounted on stem 32 in a manner to permit valve 30 to adjust itself radially (relative to the longitudinal axis of stem 32) to self-center and self-seat in conical valve seat 26 even though the aforesaid alignment does not exist in the particular valve at that particular time. To that end, stem 32 is provided with a reduced-diameter or necked-down portion 36 near its end, defining a shoulder 38. Annular valve 30, which is supported on portion 36, is provided with a central, circular, aperture 40 which accepts the reduced-diameter portion 36 of stem 32. To the right of valve 30, stem 32 is further necked-down to accept a retaining ring 42 which retains valve 30 on stem 32. To permit radial adjustment of valve 30 relative to the longitudinal axis of movement of stem 32, the aperture 40 in valve 30 is made larger than the reduced-diameter portion 36 of stem 32, although aperture 40 is sufficiently smaller than the diameter of stem 32 to the left of the valve so as to provide a sealing engagement between the valve and the stem at the shoulder 38 at all radial positions of valve 30 and during the times in which valve 30 is in abutment with valve seat 26. It is presently contemplated that valve 30 be made of nylon plastic and valve seat 26 and stem 32 be metallic. In one design of the system, as some numerical examples, valve 30 was 0.78 inches in outer diameter, the engaging surface 34 was formed on a one inch spherical diameter, aperture 40 had a diameter of 0.36 inches, stem 32, in the region to the left of valve 30, had a diameter of 0.625 inches, and portion 36 of stem 32 had a diameter of 0.313 inches.

The valve assembly of FIG. 1 includes a diaphragm or piston or movable wall portion 44 the central portion of which is clamped between a stop washer 46 and a cup washer 48, that assembly being locked to the left-hand end of valve stem 32.

The outer periphery of diaphragm 44 is clamped between a body member 50 (which may be plastic or die cast) and a cover stamping 52 which serves the several additional functions of providing a means for mounting the valve in place, of providing an area against which washer 46 may stop, of guiding stem 32 in its movement, and of defining, in conjunction with diaphragm 44, a chamber 54 to the right of diaphragm 44. Body member 50 includes a central recess which forms, with diaphragm 44, a chamber 56 to the left of that diaphragm, body 50 being notched at 58 to insure that cup-shaped washer 48 does not preclude the free flow of air in the chamber. Washer 48, in moving within chamber 52, also serves to guide the movement of stem 32 and further helps to position and guide a spring 60 which is mounted within the chamber 56 and operates in compression between body 50 and washer 48, tending to move the central portion of diaphragm 44 and stem 32 toward the right to the illustrated position.

The positive pressure from the pump appearing at port 10 is communicated into chamber 54 through a passageway 62 which is sufficiently large to permit the free flow of air into and from chamber 54 as the pressure in port 10 changes. The pressure in port 10 is further communicated to chamber 56 through a passageway 64 in stem 32, through tapered passageway 66, and through orifice 68. Accordingly, under normal, relatively steady conditions, the pump pressure as it appears in port 10 is established both in chamber 54 and in chamber 56. When valve 30 is in engagement with seat 26, its right hand face is subjected to the pressure in port 24 (which will normally be either atmospheric or below atmospheric pressure). The left hand face of valve 30 is subjected to the pressure in port 10 which is normally above atmospheric value. The pressure in chamber 54, while operating on washer 46 and diaphragm 44, is not effective on that area thereof represented by the cross-sectional area of valve stem 32, whereas the pressure in chamber 56 acts essentially effectively upon the entire area of the left side of diaphragm 44, including washer 48. Those pressure differentials, coupled with the force exerted by spring 60, (which is quite small) serve to hold valve 30 closed under the normal static conditions, as is illustrated in FIG. 1 of the drawings.

As will be seen, means are provided for abruptly reducing the pressure in chamber 56 in response to one type of signal condition in the system with which the apparatus is associated. When this occurs, a pressure differential appears across diaphragm 44 which produces leftward movement of valve stem 32 against the bias of spring 60 to disengage valve 30 from valve seat 26, so as to divert the air through port 24. In that mode of operation, it is desired to restore valve 30 to its closed position after a selected time. This is accomplished by metering air from port 10 into chamber 56 through orifice 68. The effective impedance to air flow of orifice 68 controls the time required for reseating of valve 30 to occur. Tolerance variations can produce significant differences in the restoration rate from one valve to another in mass produced units. To achieve the desired consistency among those units, orifice 68 is calibrated on a per-valve basis by forming it (in the preferred arrangement) in a plug 70 of deformable material and selectively deforming that material to effectively control the size of orifice 68. Thus, in the illustrated arrangement, plug 70 is made of a material which is more malleable or deformable than the material of which stem 32 is made. As an example, plug 70 may be constructed of so-called "S" grade aluminum which is a soft grade of aluminum. Stem 32 may be formed of significantly harder aluminum, such as the grade designated "T-3" or "T-4." Desirably both the plug and the stem are of the same type of material (e.g., aluminum) to match temperature coefficients of expansion within adequate limits.

In the illustrated unit FIGS. 1 and 6), the exterior of the central portion of the plug 70 is a cylindrical surface (in the generic sense), representatively constructed by forming that central portion as a circular cylindrical surface, and then forming a cylindrical notch 68 therein. As an example, in one design, the circular cylinder was nominally 0.129 inches in diameter and the notch was formed as a portion of a circle having a 0.032 radius penetrating the surface of the circular cylinder nominally 0.007 inches.

Plug 70 is inserted in tapered cavity 66 in stem 32. In one design, cavity 66 is formed by drilling and then by reaming with a number 2/0 taper pin reamer, reaming to a nominal 0.131 maximum diameter at the entrance 72 to the tapered chamber 66. The leading end of the plug 70 is desirably chamfered to assist in centering the plug upon insertion in the tapered cavity, and that chamfering is achieved by forming the leading end as a frustoconical surface. In practice, both ends are desirably made the same to facilitate assembly.

Referring to FIG. 7, plug 70 is desirably inserted in the cavity 66 after washers 46 and 48 and diaphragm 44 have been assembled to stem 32 but before the rest of the valve has been assembled. A drive pin, punch, or drift 74 is provided with a seat or cavity in its leading end which is desirably conical or frusto-conical and complementary to the shape of the trailing end of the plug 70. Drift 74 should be smaller in diameter than the plug 70 so as to avoid any risk of deforming the metal adjacent orifice 68 (as by forming a burr), and the use of the conical end on plug 70 together with the conical cup in drift 74 provides self-centering to insure that drift 74 does not engage plug 70 in the region of the slot 68. In one design, drift or punch 74 was selected to have a diameter of 0.090 inches. Drift 74 is slidably sealed in a chamber 75 which is also provided with an aperture 76. A seal 77, adjacent aperture 76, can be pressed into air sealing engagement with the left hand end of stem 32. A source of positive air pressure 78 is connected to chamber 75 through an orifice 79. A pressure gauge 80 measures the pressure in chamber 75.

The plug 70 is first positioned at the entrance of the tapered cavity 66. The unit including chamber 75 is then placed into sealing engagement with stem 32, as noted. Punch or drift 74 is then pressed or tapped to force plug 70 into cavity 66. The air from source 78 flows through orifice 79 and through orifice 68, in series, to atmosphere. Hence, the reading of gauge 80 reflects the effective size of orifice 68. That gauge can be calibrated by using a standard valve to which production valves must conform. The operator continues to press or tap punch or drift 74 to progressively force plug 70 further into cavity 66. During that driving motion, plug 70 is compressed and deformed, so as to effectively flow metal into the slot 68, reducing the effective cross-sectional area thereof. Driving is discontinued when the gauge reading attains the preselected value.

It is contemplated that other arrangements may be employed to produce relative distortion of the two metallic elements (with or without a permanent set) to achieve a functional determination of the correct orifice size to produce consistency of performance of the mass produced valves. Obviously, the two parts need not be aluminum, and, as another example, they could well be both manufactured of steel. The two parts should have similar temperature coefficients of expansion. The necessity of progressive deformation of one or both of the parts dictates that at least one must not be too hard or too rigid to accommodate that deformation. For example, it is contemplated that the tubular stem 32 be manufactured with a substantially thinner wall than that illustrated, that is, with the thickness between the wall of cavity 66 and the exterior of stem 32 much reduced from that illustrated, with the plug 70 being provided with a flat instead of a groove and being driven within the cavity 66 in a manner to physically progressively distort the tube (with or without a permanent set) to effectively reduce the gap between the plug and the stem 32 with progressive insertion. Similarly, it is contemplated that the tube be of a softer material than the plug so that when the plug (grooved or with a flat) is progressively inserted, the metal of the tube will cold flow to progressively reduce the size of the cavity between the plug and the tube. Other variations will be apparent to those skilled in the art.

Referring again to FIG. 1, the generally cup-shaped body 50, which may be, for example, plastic or a die casting, has, in addition to the peripheral lip against which diaphragm 44 is clamped, a central plate portion 81 including a central projection 82 having an air passageway 84 extending longitudinally therethrough. The right-hand end of projection 82 constitutes a valve surface 86 cooperating with a valve seat 88 formed at the entrance to cavity 66 in valve stem 32. At the other end of passageway 84, a central valve seat 90 is formed in plate portion 81 to cooperate with a valve 92. A further valve seat 94, which is annular, is formed on the left-hand face of plate portion 80 radially outwardly from valve seat 90, for cooperation with an annular valve 96. A further annular valve seat 98 is also formed on the left-hand face of plate portion 80 at a greater radius than that of valve seat 94, valve seat 98 cooperating with annular valve 100.

In the illustrated arrangement, valves 92 and 96 are formed integrally, as of rubber, that integral element having one or more air passageways 102 therethrough adjacent valve 92, and further having a base flange 104 provided with one or more perforations accepting one or more pins 106 projecting from the base of a piston or carrier 108 which may be of plastic. Those same pins 106 also engage perforations in an annular base portion 110 of a second integral rubber member which also includes the flap (or lip) type annular valve 100. The two integral rubber members are secured to the carrier 108, as by means of retaining rings.

Carrier 108 is further provided with a central air passageway 112, aligned with valve 92, and a radial notch-type orifice 114 extending therefrom. A spring washer 116 acts between carrier 108 and valve 92, tending to force valve 92 to the right away from the carrier 108. A compression spring 118 operates between the left-hand face of carrier 108 and a base plate 120 which is secured to the body 50.

The function of the just-described subassembly including valve 92 is that of a pilot valve to sense changes in the intake manifold pressure of the engine with which this system is associated and to operate in response to preselected changes of that intake manifold pressure to change the pressure in chamber 56 in a manner to produce desired movement of movable wall or diaphragm 44 so as to control valve 30. The function of physically moving valve 30 is performed by diaphragm 44, separately from the intake-manifold-pressure sensing function, and the function of timing the duration of the opening of valve 30 is also performed by apparatus including diaphragm 44 and orifice 68, rather than by the pilot valve assembly.

To permit sensing of the intake manifold pressure conditions, body 50 is provided with an integral nipple 124 which is connected by a hose to the intake manifold of the internal combustion engine. That intake manifold pressure is communicated through nipple 124, through a passageway 126 in body 50, through one or more slots 128 in body 50, constituting passageways, and to the chamber 129 defined in part by base plate 120 and carrier 108. That instant pressure condition is then communicated (by air flow in either direction) through passageway 112 and through orifice 114 to the chamber 130 which is defined in part by valve 100, body 50, and valve 92. It will be observed that those instant pressure conditions will also be communicated through passageway 126 to the volume 132 adjacent the outer surface of the annular valve 100.

Body 50 is further provided with an air passageway 134 connected to atmosphere and communicating with a chamber 136 which includes the inner faces of the annular valves 100 and 96. Accordingly, when the vehicle is being driven at a steady condition down the road, so that the intake manifold pressure is not significantly varying, a pressure differential exists across flap valve 100 tending to maintain it in seated engagement with valve seat 98, and a pressure differential exists across flap valve 96 tending to keep it seated against seat 94.

In addition to the opening force resulting from the fact that valve 92 is exposed to above atmospheric pressure through passageway 84, the pivot valve assembly (also including piston 108) is also subjected to the air pressure conditions in chambers 129 and 130. The effective area against which the effect of the below atmospheric pressure in chamber 130 is exerted is substantially less than the effective area against which the pressure in chamber 129 is exerted and that difference is in a sense to tend to open the pilot valve assembly. However, spring 118 is selected at a value to maintain the valves closed under relatively steady state intake-manifold vacuum conditions. As an example, that spring may exert a force of 5 pounds in a design in which the effective area operated on by the pressure in chamber 130 is 0.3 square inches and in which the effective area operated upon by the pressure in chamber 129 is 0.8 square inches.

With gradual changes in the intake manifold pressure of the vehicle, the pressures in chambers 129 and 130 adequately rapidly equalize, due to the flow of air through orifice 114, and the pilot valve remains in the illustrated condition. The pilot valve will not be responsive to a rapid increase in the absolute pressure of the intake manifold since that will create, transiently, a greater pressure in chamber 129 acting on the larger valve area, and hence tending to keep valve 92 closed. However, upon an abrupt decrease in the absolute pressure of the intake manifold, the pressure in chamber 129 will transiently drop substantially below the pressure in chamber 130 (since the rate of pressure-equalizing air flow through orifice 114 is small), creating a pressure differential tending to open valve 92. If the magnitude of that pressure differential is adequate, in the light of the other forces acting upon the pilot valve system as above discussed, pilot valve 92 pops open. As that occurs, the positive pressure in chamber 56 prompts the flow of air through passageway 84 to increase the pressure in chamber 130, so as to increase the instant pressure differential tending to hold valve 92 open. Thus, valve 92 in effect acts regeneratively, the partial opening of that valve creating forces tending to fully open that valve. Thus, orifice 114 needs only to be small enough to delay the application into chamber 130 of the reduction of vacuum which occurs in chamber 129 long enough for pilot valve 92 to crack and regeneratively pop open.

The function of valve 92 is to rapidly reduce the pressure in chamber 56 so as to prompt the diverter valve to perform its function. To this end, when valve 92 opens, the positive pressure in chamber 56 (as it now appears in chamber 130) establishes a pressure differential across the flap valve 96 in a sense to separate flap valve 96 from valve seat 94 so that the positive pressure in chamber 56 will produce flow of air through chamber 130 and past valve 96 to atmosphere through passageway 134. Further, when the pilot valve assembly including carrier 108 pops to the left under the critical sensed condition, spring 116 is freed to force valve 92 away from rubber member 108 by a small amount. This effectively open orifice 114, creating a circumferential enlargement of that orifice. As a result, the air pressure in chambers 56 and 130 produces a flow of air through the now-enlarged orifice 114 (which acts in effect as a low-impedance passageway under this condition), through passageway 112, and to the intake manifold through nipple 124. These conjoint outflow paths for the air under pressure in chamber 56 coexist until that air pressure reaches substantially atmospheric value. As soon as the pressure differential between chamber 130 and chamber 136 reduces substantially to zero, flapper valve 96 again closes and closes off the connection to atmosphere via passageway 134. Accordingly, the pressure in chamber 56 can be drawn below atmospheric value via the path including the now-enlarged orifice 114. In the preferred embodiment of the invention, the pressure in chamber 56 is reduced below atmospheric pressure to increase the pressure change during timed restoration of valve 30.

While the rate of opening movement of valve 30 can be selected as desired, in the preferred embodiment the restrictive effect of orifice 114 is reduced to a very small value so that the reduction in pressure in chamber 56 can occur quite rapidly, preferably in a fraction of a second.

During a portion of the interval in which the pressure in chamber 56 is being reduced, there will be an inflow of positive pressure air from port 10 through passageway 64, orifice 68, and past valve seat 88. However, in the preferred arrangement, the impedance to air flow from chamber 56 via passageway 134 and, in parallel, via the now-enlarged orifice 114 is small relative to the impedance to air flow presented by orifice 68.

As soon as the pressure in chamber 56 reduces enough to overcome the closing forces operating on diaphragm 44, diaphragm 44 and valve stem 32 move to the left in view of FIG. 1. That movement is rapid and is controlled by the pressure in chamber 56. It continues until valve seat 88 engages valve 86. That seating occurs when chamber 56 has been reduced to a preselected pressure (in comparison with the pressure in chamber 54) which, in the preferred arrangement, is below atmospheric pressure but is above the intake manifold pressure, from one operation even though the change in intake manifold pressure which for constancy produced the operation of the pilot valve may vary from one operation to the next. The engagement of valve 86 with valve seat 88 adequately seals the passageway 84 so that pilot valve 92 snaps closed, the rate of flow of air through orifice 68 (and 140) being too low to preclude that occurring.

The distance between valve seat 88 and valve 86 effectively determines the stroke of valve 30 which may be, as an example, one quarter of an inch. If the change in pressure of the intake manifold is such as to create the forces to open valve 92, the preferred system is designed so that this full-stroke movement of valve 30 will occur, that is, the system desirably provides full-stroke movement of valve 30 in response to any of the variety of abrupt changes of the intake-manifold-pressure conditions which should produce air diversion, rather than varying the stroke with variations in those abrupt changes of intake manifold pressure.

While, as above noted, the engagement between valve 86 and valve seat 88 adequately reduces air flow through passageway 84 to permit restoration of the pilot valve, the seal is not perfect, for a nick or other orifice means 140 is purposely formed in the valve seat 88. As a result, with chamber 56 now below atmospheric pressure due to the above-noted transient operation of pilot valve 92, and with valve 86 in engagement with valve seat 88, and with port 10 at or above atmospheric pressure, air will flow through passageway 64, through cavity 66, through orifice 68, through nick 140 into chamber 56 to start to increase the pressure in chamber 56. As soon as the pressure in chamber 56 commences to rise, diaphragm 44 and hence valve stem 32 commence to move to the right in the view of FIG. 1, separating valve 86 from valve seat 88, which eliminates the orifice effects of nick 140 and establishes calibrated orifice 68 as the controller of the rate of air inflow. As the pressure in chamber 56 approaches equality with the pressure in chamber 54, the valve becomes restored to the closed position as illustrated in FIG. 1 of the drawings.

Since, as above noted, the pressure in chamber 56 is reduced effectively to a constant value (in relation to the pressure in chamber 54) at each operation of the pilot valve 92 and since calibrated orifice 68 controls the rate of inflow of air into chamber 56, the delay in the reclosure of valve 30 to valve seat 26 can be essentially constant from one operation to the next, and among mass-produced valves.

The critical change of condition of the intake manifold pressure which prompts actuation of the pilot valve may be selected in accordance with the automobile manufacturer's needs. The controlling factor is the force tending to close pilot valve 92. Whenever that instant force (resulting from the pressures operating on different areas) is sufficient to overcome spring 118, pilot valve 92 will pop open. FIG. 2 illustrates some of those conditions. Curve 150, which is a plot of intake manifold vacuum against time, illustrates a representative condition in which the intake manifold vacuum has stabilized at about 7 inches of mercury and then (due, for example, to the driver removing his foot from the accelerator pedal) abruptly changes in a short time to a vacuum of about 19 inches of mercury. Curve 152 illustrates another common condition in which the intake manifold vacuum abruptly changes from just over 5 inches of mercury to just under 25 inches of mercury. Curve 154 represents another example in which the intake manifold vacuum abruptly changes from a value of about 2 inches of mercury to a value of about 16 inches of mercury. Under each of these conditions, in the representative system, the valve 30 should be abruptly opened and slowly closed to establish a time delay adequate to permit the transient and dangerous condition to dissipate. The physical movement of valve 30 from its 0 or closed position is illustrated by curve 156 in FIG. 2. In that representative curve, valve 30 moves from its fully closed position to its fully opened position (representatively one quarter of an inch) in less that ½ a second and then slowly closes, not becoming fully closed until about 6 seconds after its opening movement was initiated. The consistency of operation of which the valve is capable is reflected in the presentation of but one curve 156 common to each of the curves 150, 152 and 154.

In the condition illustrated in FIG. 3, the intake manifold changes abruptly from a value of about 2 inches of mercury to a value of about 14 inches of mercury, a sensed condition which, in the assumed system with which the apparatus is associated, should not produce diverting movement of valve 30. With an appropriately designed valve of the type illustrated, that illustrated change will not produce diversion. The difference between curve 158 and the curves 150, 152, and 154 illustrates the capability of the disclosed valve to accurately respond when it should respond and to not respond when it should not respond.

The pilot valve system including valve 92, thus far described, serves the function of actuating (via diaphragm 44) valve 30 through a timed cycle from closed to open to closed in response to an abrupt change of the intake manifold pressure of a preselected degree and between preselected ranges. That cycle of operation occurs in a preselected time period, which, with the noted design, may be constant or effectively constant, if desired, despite variations of the sensed conditions within those ranges of variation.

In some applications, it may also be desirable to reduce the magnitude of the air flow through the utilization system in response to other intake manifold conditions which are not or need not be transient.

Thus, with some utilization devices and particularly with some catalytic converters, it is or may prove desirable to reduce the magnitude of air flow during continuing low intake manifold vacuum conditions, either abruptly (that is, an abrupt reduction to a preselected value) or on a progressive basis (that is, a progressive reduction in the rate of flow as a function of the magnitude of the reduction of the intake manifold vacuum below a preselected value). Correlative considerations may apply with continuing high intake manifold vacuum conditions.

An example is illustrated in FIG. 5 of the drawings, which is a plot of air flow through port 20 (of FIG. 1) versus intake manifold vacuum. The normal air flow (with valve 30 fully closed) is illustrated by horizontal portion 170 of the curve of FIG. 5. In the representative system reflected by the curve of FIG. 5, at an engine vacuum of about 5 inches of mercury, the rate of air flow through port 20 is progressively or proportionately reduced, as illustrated by curve portion 172, reaching zero flow (that is valve 30 fully open) at approximately 3 inches of mercury intake manifold vacuum. Similarly, portion 174 of the curve of FIG. 5 indicates a representative reduction of the air flow through port 20 in response to an intake manifold vacuum of a high value, the air flow commencing to reduce at about 18 inches of mercury vacuum, and progressively and proportionally decreasing as the intake manifold vacuum rises above that figure. Both curve portions 172 and 174 are purely representative in their point of institution and their slopes may readily be changed by those skilled in the art.

In the illustrated embodiment of the invention, the means for producing portion 172 of the curve of FIG. 5 includes a valve 176, which may be of rubber, cooperating with a valve seat 178 formed integrally with body 50 and surrounding a port 180. Valve 176 is an enlarged integral element of a diaphragm 182, the peripheral bead of which is trapped in an annular cavity 184 in both 50 by a plate 186 which is apertured at 188 to expose the upper surface of diaphragm 192 to atmospheric pressure.

A reinforcing plate 190 which may be of rigid plastic or metal, is embedded in an annular slot in valve 176 and underlies diaphragm 182 to prevent the collapse of that diaphragm which could otherwise occur with the upper side of the diaphragm being at atmospheric pressure and the lower side being occasionally subjected to high intake manifold vacuums. A compression spring 192 operates between a seat on body 50 and reinforcing plate 190.

Chamber 194, to which the underside of the major portion of diaphragm 182 is exposed, is essentially at intake manifold pressure in view of the direct connection of that chamber to intake manifold through nipple 124. Accordingly, when the vehicle is operating, atmospheric pressure at the upper surface of diaphragm 182 tends to force valve 176 into sealing engagement with valve seat 178, spring 192 tends to open the valve, the positive pressure in chamber 56, operating on the under surface of valve 176 within valve seat 178, tends to open the valve, and the vacuum in chamber 194 tends to close the valve 176. Balance of these conditions may be selected at any suitable value, such as the above indicated 5 inches of mercury vacuum in the intake manifold. When the intake manifold vacuum is higher than that value, valve 176 will remain continuously closed and will perform no function in the operation of the system. As the intake manifold vacuum decreases below that value (that it moves toward its atmospheric value) valve 176 is separated from seat 178, permitting the air under positive pressure in chamber 56 to escape (at a controlled maximum rate) through orifice 180, through the orifice created by the variable separation of valve 176 from seat 178, and to the intake manifold through nipple 124. Valve 176 operates degeneratively so that it does not tend to pop open in response to this condition. As a result, a fluid-dynamic condition exists with air flowing from the pressure in port 10 through passageway 64, orifice 68, chamber 56, orifice 180, valve 176, and the intake manifold, to selectively reduce the absolute pressure in chamber 56 so as to establish a new position for diaphragm 44 and hence a new relationship between valve 30 and valve 26, partially opening that valve as a function of the reduction in intake manifold vacuum below the preselected value. A representative relationship is illustrated in portion 172 of the curve of FIG. 5. If it is desired to increase the slope of portion 172, valve seat 178 can be made smaller; while it is is desired to decrease the slope of portion 172, the valve seat 178 can be made larger. The point of initiation of the portion 172 of the curve of FIG. 5 can be controlled, for example, by selection of spring 192.

If it is desired to reduce the rate of air flow at high intake manifold vacuums, in the pattern of portion 174 of the curve of FIG. 5 (or some other pattern), this may be accomplished, as an illustrative example, with a mechanism such as that shown in FIG. 1A of the drawings, used alternatively to the mechanism including valve 176 in FIG. 1 of the drawings or, if both portions 172 and 174 are desired, supplementary to the mechanism including valve 176, by disposing the mechanism of FIG. 1 at some other circumferential point on the body 50.

The mechanism of FIG. 1A includes a valve 200, made, for example, of rubber, which is integral with a diaphragm 202, the peripheral bead of which is suitably clamped to the body 50 by means including a clamping ring 204 and a clamping plate 206. A spring 208, operating between plate 206 and valve 200, forces valve 200 into sealing engagement with a valve seat 210, which defines a passageway 212 communicating with the chamber 56. Since the valve 200 is spring biased closed, it is not essential that the communication between the valve seat 210 and chamber 56 include a restriction or orifice correlative to orifice 180 in FIG. 1. The volume above diaphragm 202, which is a part of chamber 194, is at intake manifold pressure, and chamber 214, below diaphragm 202, is in communication, through passageway 126a, with the intake manifold pressure of the engine via nipple or fitting 124 (FIG. 1). The pressure in chamber 56 tends to open valve 200, operating on an area thereof through valve seat 210. Intake manifold pressure in chamber 214 tends to close valve 200, intake manifold pressure in the chamber above diaphragm 202 tends to open the valve 200, and spring 208 tends to close that valve. Spring 208 is selected to maintain valve 200 closed until a preselected pressure is reached such as the approximately 18 inches of vacuum illustrated in FIG. 5 of the drawing at the initiation of curve portion 174. When the intake manifold vacuum exceeds the preselected amount (that is, when the absolute pressure sufficiently reduces), valve 200 commences to open, operates degeneratively as before, and modulates the outflow of air from chamber 56 in a manner to progressively translate valve 30 away from engagement with valve seat 26 (FIG. 1) to reduce the effective rate of air flow via port 20 to the utilization system, pursuant to the pattern of curve 174 in FIG. 5. Again, the initiation point of that curve can be selected as requirements dictate and the slope of that curve can be adjusted by utilizing the principles previously noted.

In the valve system illustrated in FIG. 1 of the drawings, chamber 56 is normally at a pressure above atmospheric pressure and the reduction of that pressure produces either an abrupt or a progressive translation of the valve 30 away from engagement with the valve seat 26 in accordance with the nature of that signal. The fact that chamber 56 is at a positive pressure and that valve 30 can be translated in response to reduction in that air pressure permits the valve system of FIG. 1 of the drawings to serve a further function. Thus, in a post-combustion system in which there is supplemental burning of the emission products of an engine, safety requirements may dictate that the auxiliary combustion chamber not be supplied with oxygen at a rate which will create a dangerous overtemperature condition in that combustion chamber, whether that combustion chamber be a catalytic converter, such as the unit 22 representatively illustrated in FIG. 1 of the drawings, or some other unit. If such overtemperature conditions are sensed, means should desirably be provided to terminate that condition, which requires both sensing of the overtemperature condition and effective control of the air flow in response thereto. In the illustrated system, this is accomplished by providing a senser 216, mounted in the casing 214 of the catalytic converter 22 (or other post-combustion device) to sense the existence of a critical over-temperature condition therein. Senser 216 may comprise a cup element 218 projecting within casing 214 so as to be exposed to a critical internal temperature. A tube 220 projects within the cup 218. Tube 220, in the illustrative embodiment, is connected by a suitable hose to a nipple 222 formed in body 50 the passageway through which communicates through one or more notched passageways 58 with chamber 56. Tube 220 may be supported in cavity 218, as an example, by a cover 224 which engages both the cup 218 and the tube 220 and which has a passageway 227 therethrough extending to atmosphere. Cup 218 may be ceramic and tube 220 and cover 224 may be of stainless steel. However, if corrosion problems are serious, as they may well be in a given utilization of the principles of this system, both cover 224 and tube 220 may also be ceramic, if desired, or of other suitable heat and corrosion resistant materials.

Cup or pot 218 is substantially filled with, and tube 220 is sealingly embedded in, a substance 226 which has the characteristic that it is solid (and effectively seals tube 220) at any temperature below that preselected critical temperature, but is liquid thereabove. It should further have the characteristic of having a suitable pressure head while molten, with a feasible distance between the lower end of tube 220 and the upper surface of the substance 226.

Below the aforesaid critical temperature, substance 226 is solid and effectively seals tube 220 so that no air can flow from chamber 56 through tube 220, and the valve system of FIG. 1 operates precisely as described. During that normal operation, chamber 56 of the valve system continues to remain at an aboveatmospheric pressure condition. If, during that operation, so much air flows through the catalytic converter 214, or other such device, as to create a critical overtemperature condition, heat is transferred through cup 218 to the substance 226, to melt that substance. Upon becoming molten, it no longer totally seals tube 220 and air under pressure in chamber 56 flows through nipple 222, through a check valve 230, to the tube 220. This pressure is positive relative to atmosphere and as a result the pressure in tube 220 will bubble air through the now-molten substance 226, that air escaping to atmosphere through passageway 227. That bubbling will occur at whatever rate is necessary to maintain the pressure in pipe 220 (above the molten substance) at a value equal to the head of the molten substance between the lower end of the tube 220 and the surface of that molten substance. This pressure is selected to be less (by selecting the characteristics of the substance and the extent of submersion of the tube 220 therein) at a value such that it will produce a reduction in the pressure of the chamber 56 sufficient to cause diaphragm 44 to move valve 30 to the left to divert the air from port 10 to port 24 sufficiently to reduce (to zero if desired) the rate of outflow through port 20 to the utilization system enough to reduce the temperature of the utilization system (such as the catalytic converter 214) below the critical value. When that occurs, the substance 226 will resolidify, to terminate the bubbling and to effectively block the tube 220 so that chamber 56 will restore to the pressure condition at which valve 30 is closed.

The temperature at which the substance 226 should melt, so as to cause valve 30 to be opened to divert the pump air flow, will, of course, vary with different utilization systems, and should be selected to match the overtemperature requirements of each such system. Any of a variety of substances may be employed providing they change from a solid to a liquid state at the desired temperature, pass bubbles of air while in their liquid state, do not burn or excessively oxidize under conditions of use and are otherwise generally suitable. Salts, such as alkali metal salts, are suggested, including those which have been used in the heat treating of metals, including the chlorides and nitrates of potassium, barium and sodium, and mixtures thereof, establishing various critical melting temperatures. Sodium chloride, for example, has a nominal melting temperature of 1472° F which may well be acceptable with certain catalytic converters. Materials other than inorganic salts may, of course, be employed. As an example, an alloy of 67% copper and 33% tin melts at a nomial temperature of 1365° F. As another example, if the critical temperature is higher (as it may well be, particularly with non-catalytic post-combustion devices), copper, nickel, and alloys thereof generally have higher melting points and can serve as the selected substance.

Substance 226 should be in a solid form (desirably not granulated) in the senser cavity as by casting the molten material in place in cup 218, (by heating it in situ, or heating it remotely and pouring it into the cavity while molten), or precasting appropriately shaped pellets of the material, the former being presently preferred in view of the ease of establishing a sealing relationship with tube 220.

While those skilled in the art will recognize the disadvantages of such arrangements, they will perceive that the change of state of the substance 226 which is sensed upon the attainment of the preselected temperature could be either a sublimation or a change from the liquid to the gaseous state of the substance. It is also contemplated that senser 216 could comprise a pair of stationary spaced electrical electrodes (such as a pair of spaced-apart rods embedded in the substance, or a single electrode embedded in the substance with a metallic pot 218 constituting the second electrode) which, with associated known circuitry, would detect the change in resistance (or capacitance) as the substance 226 changes from a solid to a liquid state or from a liquid to a gaseous state, and it is further contemplated that the sensor 216 could comprise a pair of electrical contacts (of which a metallic pot 218 could be one) which are held apart by the substance 226 when solid and are permitted to engage when substance 226 melts, coupled with circuitry for detecting the fact of closure and apparatus (such as a solenoid) to repetitively momentarily restore the contacts so that they will be separated when the substance 226 resolidifies. It is also contemplated that the pot 218 may be capped with a diaphragm (or bellows), such as stainless steel, in liew of the tube 220, with that diaphragm being spaced above the substance 226 and carrying, on its upper surface, an electrical contact matable, upon adequate deflection of the diaphragm, with a second electrical contact to establish an electrical signal reflecting an overtemperature condition, with the diaphragm being deflected to that critical extent in response to an increase of the vapor pressure of the substance 226 which occurs either when a given substance changes from the solid to the liquid state, or is adequately heated after such conversion, or converts from the liquid to the gaseous state, or is adequately heated after such conversion. However, those arrangements are believed to be greatly inferior to the preferred arrangement disclosed.

The curve of FIG. 4 reflects a suitable relationship between the rate of air flow to the utilization system via port 20 and the temperature sensed by the senser 216. It is assumed, in the curve, that the preselected critical temperature of the catalytic converter 214 which should not be exceeded is about 1472°, it being recognized that any given commercial unit may well require significantly different operational temperature limitations. Accordingly, the substance 226 in the senser may be selected as sodium chloride. In the portion of the curve 236, full air flow is produced, that is, valve 30 is fully closed. At about 1472° F, substance 226 melts, the pressure in chamber 56 is reduced due to the bubbling through the now-molten substance 226 and valve 30 is opened, to change the rate of air flow via output port 20 along the portion 238 of the curve of FIG. 4. It will be appreciated that the reduction in air flow can be in effect modulated, if desired, in a commercial installation so as to produce a certain reduction in the air supply to the auxiliary combustion device when that device reaches a first preselected temperature, and then further reducing the air flow if, but only if, the temperature of the device continues to rise (despite the reduction in air flow) and attains a second higher temperature, as indicated in the dotted line curve 240 in FIG. 5. It is contemplated that this can be accomplished by utilizing two sensers 216 with their tubes 220 connected in parallel to the nipple 221 and with the substances 226 in the two sensors being selected to have the desired differences in melting points.

While the high temperature sensor has been illustrated in combination with a valve having a control chamber which is normally above atmospheric pressure, with reduction of the pressure in that chamber towards atmospheric pressure producing movement of the valve in a direction to divert the pump air from the utilization system, it will be appreciated that the principles can also be applied to other types of valve systems including valves operating at other pressures, (above or below atmosphere) or in which an increase in absolute pressure is required to produce diverting action. For example, pipe 220 can be opened directly to atmosphere, and port 226 can be connected via a counterpart of nipple 222 to a valve chamber which is normaly below atmospheric pressure and will cause the valve to divert the pump air flow in response to an increase in absolute pressure. As another example, a source of positive absolute pressure can be connected to pipe 220, with port 226 being connected to a valve chamber which is below that positive pressure and which causes the valve to divert the pump air in response to an increase in absolute pressure. As a further example, port 226 can be connected to a source of negative (below atmospheric) pressure, with tube 220 being connected to a valve chamber which is at a higher absolute pressure and which produces diverting movement of the valve 30 in response to a reduction in that absolute pressure. In each case, it is desirable, of course, that the direction of air flow through the senser be downward (in the sense of the view of FIG. 1) through tube 220. The senser 22 can also be employed to actuate a different type of air-pressure or air-flow responsive device which in turn controls the actuation of a different type of diverter valve. As an example, a pressure-sensitive electrical switch (responsive to the change of pressure which results when the temperature sensitive material becomes molten) can be used to control a solenoid-controlled diverter valve. Other utilizations of the principle will be apparent to those skilled in the art whom this disclosure is directed. The disclosed system is that presently preferred.

If it is desired to signal the existence of the overtemperature condition, to warn the diverter, the apparatus 230–233 may be added to the system of FIG. 1. Check valve 230, having a low forward pressure drop, is inserted in sensers between nipple 222 and tube 220. When the system of FIG. 1 is placed in operation, the positive pressure in chamber 56 will be communicated to tube 220 via valve 230. While during subsequent use, chamber 56 may, have the pressure therein reduced during the operation of other elements of the system, in the absence of an undertemperature condition, check valve 230 will preclude the pressure in the line leading to tube 220 from reducing below that above-atmospheric value. That above-atmospheric pressure is communicated to the pressure switch 231, of any well known conventional type which includes a pair of contacts which are held open in response to positive pressure and which close only in response to the reduction of that pressure. Accordingly, in the absence of a sensed overtemperature condition, pressure switch 231 maintains its contacts open. Those contacts are in series with a battery 32 and a warning light 233 and, since they are open, warning light 233 remains extinguished. If, during the operation of the system, an overtemperature condition exists, substance 226 becomes molten and air is bubbled from chamber 56 through that molten substance to atmosphere, and the pressure in the line to the left (FIG. 1) of check valve 230 reduces. This reduction in pressure is sensed by pressure switch 231 which thereupon closes its contacts to energize warning light 233. This warning light continues not only until the overtemperature condition has been alleviated so that substance 226 is solidified, but also thereafter until chamber 56 restores to a positive pressure, which is communicated through check valve 230 to pressure switch 231 to actuate it to open its contacts and extinguish warning light 233.

Figure 8:
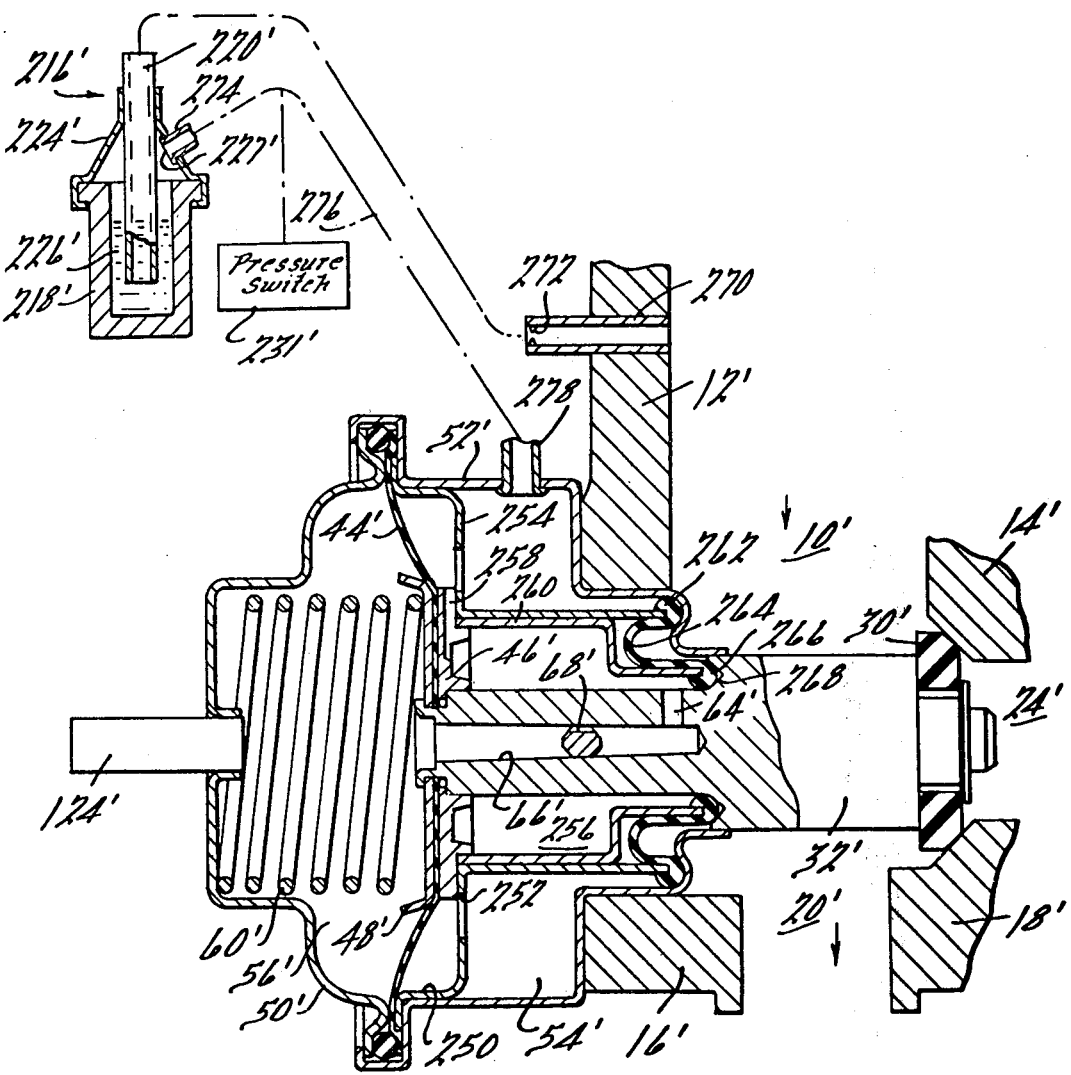
FIG. 8 is a cross-sectional view, partially fragmentary, of a modified diverter valve system including an overtemperature sensing capability.

The modified diverter valve of FIG. 8 of the drawings is similar, in respects, to that disclosed in FIG. 1 and elements performing counterpart functions are similarly designated. The valve of FIG. 8 differs primarily in that the motive force is derived from intake manifold rather than from pump pressure, the sensing and timing functions are not divorced and certain of the additional capabilities of the valve of FIG. 1 have not been disclosed in the drawing of FIG. 8.

In general, the valve assembly of FIG. 8 includes a valve 30' carried by a valve stem 32' driven by a diaphragm 44' clamped between washers 46' and 48', that assembly being biased to the right by a spring 60' disposed in a cavity 56' which is directly connected to the intake manifold through nipple 124'. Cavity 54' to the right of diaphragm 44', is connected to cavity 56' through tapered hole 66' in valve stem 32', calibrated orifice 68', and passageway 64', cavity 54' further including a cavity portion 250 connected therewith by a plurality of passageways 252 formed in a support member 254, which is supported by element 52'. Cavity portion 250 further being in communication with cavity portion 256 by means of a passageway 258 formed in washer 46'.

The annular end of support member 254 sealingly engages the bead 262 of a rolling lobe diaphragm 264, and the annular projecting end of a sleeve 260 sealingly forces an inner bead 266 on that same diaphragm 264 into circumferential cavity 268 formed in the valve stem 32', the other end of sleeve 260 bearing against, and centered on, washer 46'. As a result, rolling lobe diaphragm 264 establishes a sealing engagement with valve stem 32' and prevents the positive pump pressure which appears in port 10' from entering chamber 54' around the valve stem.

At any given steady intake manifold vacuum both chambers 56' and 54' will be at the same pressures. While those pressures act upon different areas, in accordance with the prior discussion of FIG. 1, spring 60' forces valve 30' closed under those equalized conditions.

In response to an abrupt increase in the intake manifold vacuum (a sudden decrease in absolute pressure) of adequate magnitude and in an appropriate range, the instant reduction of pressure in chamber 56' produces opening of valve 30'. Pressure equilibrium will be restored, and valve 30' will close, after a timed interval determined by calibrated orifice 68'.

The temperature senser 216 of FIG. 1 may be associated, if desired, with the valve of FIG. 8. Thus, as one example, a nipple 270 may be inserted in an aperture in housing element 12' so as to communicate with the pump pressure in port 10. Nipple 270 is provided with an orifice 272. Nipple 270 is connected by suitable tubing to tube 220' of senser 216'. A nipple 274 is secured to the cap 224' of the senser 216' communicating with aperture 227'. A tube 276 connects nipple 274 both to a pressure switch 231' and to a nipple 279 mounted in the cover 52' and hence communicating with chamber 54'.

Pressure switch 231, conventionally consisting of a diaphragm, a spring and a pair of electrical contacts, is designed to have its contacts open whenever the pressure applied thereto, though tube 276, is below atmospheric value and to close its contacts whenever the pressure applied thereto is above atmospheric value. There is an advantage to adjusting the tolerances so that the switch contacts will be closed at atmospheric pressure for lamp proving purposes, although such is not essential. Pressure switch 231' may actuate a warning lamp similar to warning lamp 233 in FIG. 1, or perform any other signalling or control function.

With the system in operation, pressure switch 231' will be subjected to the below atmospheric pressure in chamber 54' since substance 226' is solid and blocks air flow. If an overtemperature condition occurs, substance 226' melts. At that time, air will flow from port 10', nipple 270, orifice 272, pipe 220', will bubble through molten substance 226', and will then flow through nipple 274, tube 276, nipple 278, and into chamber 54'. In the preferred arrangement, orifice 272 is selected, in the light of the other parameters of the system, so that this air flow will increase the pressure in chamber 54' (despite outflow of air from chamber 54' through orifice 68' to intake manifold) to a value above atmospheric pressure. This increase in pressure in chamber 54 will product diverting action of valve 30' and will hold that valve in its open or diverting positions as long as substance 226' remains molten. In designing orifice 272, it must be appreciated that the pressure in port 10' will reduce (although still remaining above atmospheric value) in response to the operation of valve 30'.

The change in pressure in tubing 276 to a value above atmospheric pressure will actuate pressure switch 231', to prompt it to perform its signalling (including alarm) or control functions.

When substance 226' solidifies, the noted air-flow path terminates and the pressure in chambers 54' and 56' re-equalizes, through orifice 68', to reclose valve 30'.

Figure 9:
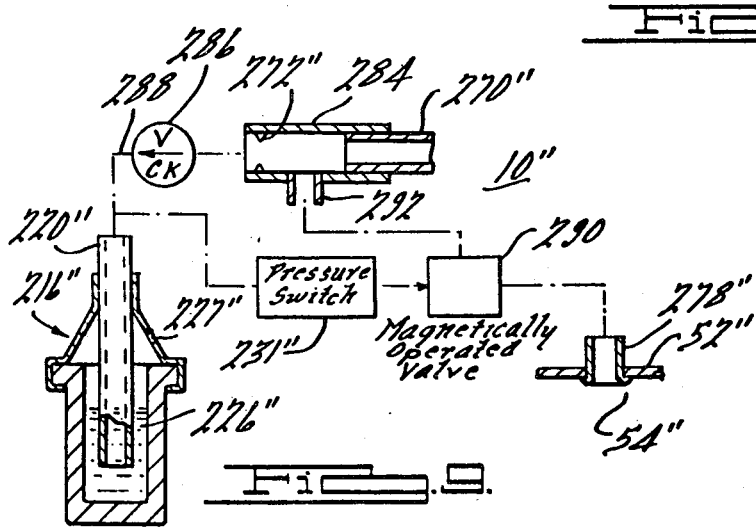
FIG. 9 is a fragmentary view of an alternative overtemperature sensing arrangement for association with the modified diverter valve of FIG. 8.

As a further illustration of the fact that the overtemperature signalling system may take other forms, a modification is shown in FIG. 9 in which a tee 284 is secured to the projecting end of nipple 270", with the orifice 272" being mounted at the outer end of the tee. The output of tee 284, through orifice 272", is passed through a check valve 286 which desirably has a low forward pressure drop. The air flowing through that check valve is applied via tubing 288, to tube 220" of overtemperature senser 216". A pressure switch 231" is connected to tubing 288 so as to be subjected to the pressure therein. Pressure switch 231", which conventionally includes a diaphragm, a spring and a pair of contacts, should be of the type which maintains its contacts open in response to a pressure above atmospheric value but should close its contacts when the applied pressure drops to a value close to atmospheric (e.g., 1 psi gauge). Pressure switch 231" in turn controls a magnetically operated valve 290 of the type which conventionally includes a solenoid structure and an air valve. Air valve 290 is connected in series between nipple 292 on tee 284 and nipple 278" on body 52".

When the vehicle is operating and the temperature of the combustion device is not abnormal, the positive pressure in port 10" is communicated through check valve 286 to pressure switch 231" to hold its contacts open, and valve 290 blocks air flow between nipple 292 and nipple 278", and the valve of FIG. 8 operates normally. If the valve of FIG. 8 diverts for some reason besides overtemperature conditions, that pressure is maintained at pressure switch 231" by check valve 286.

If an overtemperature condition exists in the combustion device so that substance 226" melts, the pressure applied to switch 231" approaches atmospheric value, due to the pressure drop across orifice 272", causing switch 231" to close its contacts and actuate valve 290 which will establish an air-flow connection between nipples 292 and 278" so as to apply positive pressure to chamber 54" to operate the diverter valve to its diverting position. The pressure in chamber 54", under this condition, can be controlled and selected, if desired, by inserting an orifice in nipple 292 of a size selected in accordance with the other parameters of the system, including the effective size of calibrated orifice 68'.

When substance 226" resoldifies, at the termination of the overtemperature condition, bubbling through port 227" terminates, resulting in the application of the higher pressure to pressure switch 231" to shut off valve 290, to cause the valve of FIG. 8 to reclose. It will be apprecited that pressure switch 231" may also serve other or additonal signalling or control functions, including the actuation of a warning light.

As above noted, the pot or cup 218 of the overtemperature senser is preferably ceramic. In the arrangement as thus far described, the overtemperature condition, as sensed by the melting of the meltable material, derives from heat transfer from the operating portions of the catalytic converter, to the ceramic cup or pot 218 and thence to the meltable material. If desired, the sensing of the overtemperature condition of the operating portion of the converter can be accomplished, or supplemented, by simulation. Thus, effective sensing can be accomplished by forming the cup or pot 218, or a portion thereof, to simulate the operating elements of the catalytic converter, such as, for example, manufacturing the cup of a ceramic with a porous surface, like the converter's porous surface, impregnated with the same catalyst used in the operating elements of the converter (such as a platinum salt). In that arrangement, the cup 218 itself serves as a tiny auxiliary catalytic converter correlative to the operating element of the main converter, would be heated to the same degree as the main operating element and would effectively sense the heat generated by its own catalytic converting operation (together with the ambient heat created by the operation of the main catalytic converter).

In the system of FIG. 9, pressure switch 231" is actuated upon the attainment of an overtemperature condition to actuate a magnetically operated valve 290, and also, if desired, to actuate a warning light. The actuation of valve 290 actuates the diverter valve to terminate or reduce the flow of fresh air from the pump to the catalytic converter. In some circumstances, this will not relieve the overtemperature condition of the converter if the engine is malfunctioning. For example, if a spark plug is defective, there may be sufficient air introduced into the converter from the engine, (through the exhaust manifold) to maintain or extend the overheating condition of the converter even though the pump be diverted. FIG. 10 illustrates how the sensing of the overtemperature condition (such as the actuation 231" in FIG. 9) can be used to operate a magnetically operable valve 291 to operate a bypass 292 of the catalytic converter 221, as long as the overtemperature condition continues.

The addition of the bypass and the bypass control equipment of course entails expense to the public, and to the degree that it serves only, or primarliy, the function of preventing destruction of the catalytic converter as a result of the occasional negligent driver continuing to operate his car with a defective engine, the interest of the majority of the publig might better be served by imposing upon the operator (rather than the car company and hence the rest of the buying public) the burden of paying for the replacement of the catalytic converter if it is destroyed as a result of his negligent failure to properly maintain his engine. In the arrangement of FIG. 11, the pressure switch 231' is also utilized to actuate a warning light 293 exposed to the driver's view, as on the instrument panel and to signal him that he should immediately shut off the engine and permit the catalytic conveter to cool. FIG. 11 also discloses a counter 294 (which may be buried in the automobile and sealed) which is stepped upon each actuation of pressure switch 231" to provide information to the dealer and car company as to whether the replacement of the catalytic converter should fairly be a warranty expense or whether the driver permitted the overtemperature condition to repetitively occur without attending to it. FIG. 11 further discloses, as an addition or alternative, a timer 295 (which may also be buried in the vehicle and sealed) which is actuated to measure time throughout the duration of each actuation of pressure switch 231", to reflect the total amount of time that the catalytic converter was subjected to overtemperature conditions, for the same purpose. Either a counter or a timer may be actuated, of course, other than by a pressure switch, and in response to any means for signalling the existence of an overtemperature condition.

As previously discussed, a function of the subject valve, in its illustrative utilization, is to selectively and temporarily reduce (or terminate) the fresh air flow through the catalytic converter (or other emission reducing system) under vehicular operating conditions which would make it dangerous, damaging or unwise to continue to flow fresh air through the converter at full volume. The vehicular operating conditions are, essentially, engine operating conditions and may be (and are in the illustrated arrangements) sensed by sensing the intake manifold pressure of the engine and/or changes thereof. The valve serves to selectively and temporarily reduce the fresh air flow in response to an intake-manifold pressure condition or condition change constituting an indication that a reduction in air flow should be instituted. However, the relation between the intake maniflod pressure (and changes thereof), and the condition decreeing a reduction in fresh air flow, changes with the altitude (or elevation) of the vehicle as a result of the inherent characteristics of the engine. Accordingly, a preselected intake manifold condition or change of condition accurately reflecting, at sea level, a need to reduce air flow, will not accurately reflect that need at high altitudes, and vice versa. Hence, a diverter valve which is designed to respond to a certain intake manifold pressure condition or change thereof will not produce proper diversion at both sea level and high altitudes. As an example, if a diverter valve is set to divert in response to a transient change in the intake mainfold pressure of 15 inches of mercury, so as to properly produce diverting action at sea level, it will fail to divert, even though it should, at high altitudes, (such as 8000 feet) simply because the requisite signal is not received from the intake manifold. If, to insure proper diversion and the avoidance of dangerous or damaging conditions at the higher altitude, the magnitude of the change of intake manifold pressure which signals diversion is reduced to 10 inches of mercury, then in normal power-pattern driving at sea level the diverter valve will tend to cycle (even though there is no condition requiring diversion) and the quality of emission control will be impaired.

Unless an acceptable compromise can be effected, the valve of FIG. 8, for example, is subject to that defect. It is essentially solely responsive to intake manifold pressure and changes thereof. It has no effective altitude compensating capability. While pump pressure does change with altitude, and while the valve of FIG. 8 is minorly responsive to pump pressure, the responsivity is in the wrong direction to compensate for the failure of the signal to accurately indicate the need to reduce air flow over the range of altitudes, and in fact the responsivity to pump pressure variations with altitude is in a direction to increase the erroneous operation of the valve with major altitude changes.

The diverter valve should desirably be imbued with a capability to change the character of the diverting action, with changes in vehicle altitude, in a compensatory direction so as to produce proper diverting action under all altitude conditions.

This can be accomplished by sensing altitude, as with a barometric type senser, and utilizing that signal to modify the operation of the diverter valve. However, a simpler and more economic method of effectively sensing altitude is available in two forms. First, as above noted, the pump output pressure varies with altitude and the sensing of the pump pressure can provide an adequate sensing of altitude and that sensing can be utilized to modify the operation of the diverter valve in a compensatory direction. Further, in a system in which the air flow from the pump is directed to the exhaust manifold of the engine so as to join with the exhaust emission in its flow to the catalytic converter, the exhaust manifold back pressure (particularly when the pump is diverted) also signals and reflects the altitude of the vehicle, in its relation to intake manifold pressure. Either or both of those signals can be used to provide compensation for the variations resulting from altitude changes.

In the system of FIG. 1, the pressure from the pump is used as a motivating force for operating the valve. When the intake manifold pressure or pressure change dictates operation of the pilot valve to fully open valve 30, the duration of the fully open condition and the time required for the valve 30 to move back to its illustrated closed position will both be determined by the time required for sufficient air to flow through calibrated orifice 68 between chambers 54 and 56 to establish the pressure-difference conditions which will cause that reclosing of the valve, and the pressure in chamber 56, at the commencement of that bleeding reflects an instant intake manifold pressure, and the pressure in chamber 54 reflects the instant pump pressure. The direction of the change of pump pressure with altitude, as reflected in the pressure in chamber 54, is correct to cause the valve to compensate for those changes in intake manifold pressure with altitude which cause the change of intake manifold pressure to fail to accurately indicate when diversion should occur.

The change of altitude, however sensed, can be employed to modify the input intake-manifold pressure or pressure change which is required to produce action of the diverter valve, can be employed to modify the duration of full opening of the diverter valve, can be used to modify the time required for the valve to fully close once it commences closing, or a combination of any thereof.

The modified form of diverter shown in FIG. 12, illustrates how the changes of exhaust manifold back pressure, with altitude changes, can be effectively utilized to cause the diverter valve to compensate for altitude changes, and also illustrates how the changes in pump pressure, with altitude, can be utilized to cause the diverter valve to compensate for altitude changes. In the illustrative arrangement, to show the capability to sense both of the above conditions, the duration of the fully open condition of the valve is modified primarily in response to intake manifold back pressure changes with altitude, and the duration of the time required for the valve to move from its fully open to its fully closed position is modified, the valve to move its fully open to its fully closed position is modified, to compensate for altitude, primarily in response to the changes im pump pressure which occur with altitude. Both are in effect compared to an instant intake manifold pressure condition, which, of course, also changes with altitude.

The modified diverter valve of FIG. 10 of the drawings is similar, in respects, to that disclosed in FIG. 1 and elements performing counterpart functions are in general similarly designated. Certain of the additional capabilities of the valve of FIG. 1 have not been disclosed in the drawing of FIG. 10.

In general, the valve assembly of FIG. 10 includes a valve 30'' cooperating with valve seat 26'' and carried by a valve stem 32'' which is driven by a diaphragm 44'' clamped between washers 48'' and 46'', the latter of which serves as a deflector to shield diaphragm 44'' from direct impingement by hot gases. The described assembly is biased to the right by spring 60'' disposed in a cavity 56'' disposed between the generally cup-shaped body 50'' (which may be made of plastic) and the diaphragm 44''.

Body 50'' is provided with a rightwardly extending projection 300 which loosely slidably engages an enlarged cavity 302 in valve stem 32'' to guide the later in its reciprocatory movement along its longitudinal axis during the operation of the device.

As in the system of FIG. 1, the valve is illustrated in association with, and includes, elements of a positive air pressure generating system, such as a pump, having a pump outflow port 10 (connected to the pump) formed in a housing designated 12'', 14'', 16'' and 18'', all of which parts are normally integral and may be elements of the pump housing itself or elements of the conduit in or to the pump. However, in FIG. 10 the outlet port 20'' to the utilization system is laterally offset from the inflow port 10''. Cap 52'' projects into the port 10'' but the port 62'' is made much larger than in FIG. 1 to offer a low restriction to the flow of air from the pump, through the cavity 54'', and out to the utilization system outlet 20'' via an enlarge arcuate slot 304 formed in the wall of housing 52'' in alignment with the outlet 20''. Port 304 is made sufficiently large as to offer a minimum impedance to the flow of air from the pump and may in practice be 180° long or more.

When the valve is in its illustrated position (which, since the illustrated valve is a diverting valve, may be termed the "closed" condition), the pump pressure, as it appears at inflow port 10'', also appears in chamber 54'', and is also communicated through port 64'', bore 66'', through calibrated orifice 68'' and through the annulus between bore 302 and guide projection 300 (which has no significant orificing effect) to cavity 56''. As a result, in this steady-state condition, there is effectively no pressure differential across diaphragm 44'' and the valve 30'' is closed by the action of spring 60'', operating between the body 50'' and the washer 48'', aided by the pressure differential across valve 30''.

When the valve 30'' is opened (translated to the left) by an action to be described, inflow port 10'' is connected to return port 24''. In addition, the left-hand annular face 308 of valve 30'' adequately seals against valve seat 306 on housing 52'' so that valve 30'' also effectively seals the pump pressure from chamber 54''. As a result, chamber 54'' is effectively connected to the utilization system. That may be, as examples, a direct connection to the exhaust manifold of the internal combustion engine (with that manifold also being connected to a catalytic converter), or such a connection through a volume check valve operating in a direction to impede flow through port 20'' in an upward sense in the view of FIG. 10, and roadily permit flow in a downward sense. It will be observed that under this fully open condition of the valve, in which valve surface 308 is effectively sealed to valve seat 306, pump pressure is no longer communicated to port 64'' but rather the pressure in chamber 54'' appears at port 64''. Equalization of pressures (or pressure change toward equalization) between chambers 54'' and 56'' occurs (with flow in either direction, as appropriate) under the control of the calibrated orifice 68''.

The outer bead of an annular draphragm 310 is trapped between the body 50'' and the cap 120'', and the inner bead of that diaphragm is clamped to the carrier 108''. The carrier 108'' is biased to the right by a spring 118'' acting against the end of cap 120'', is connected to the intake manifold of the engine. Pilot valve 92'' cooperates with valve seat 90'' to control the flow of air between chamber 56'' and 130'' via passageway 84''. Valve 90'' is supported on a stem member 312 having a tapered or conical section 314 which passes through and cooperates with a bore 316 centrally disposed in the carrier 108'', bore 316 being desirably a few thousandths larger in diameter than the largest diameter of the tapered section 314 to permit passage of air therebetween under all conditions. Stem member 312 has a portion 318 which projects to the left through and is guided in an aperture in a tab 320 on the cap 120'', tab 320 not significantly interfering with the flow of air between chamber 120'' and nipple 124''. A collar 322 is formed on stem member 312 a distance to the right of tab 320 (in illustrated position of the apparatus) which is less than the distance between carrier 108'' and the abuttable portion of cap 120''.

Under steady-state conditions, with the intake manifold at any constant pressure, that pressure appears in chamber 128'' and is communicated through the annular passageway between stem section 314 and bore 316, and then through an orifice 324 (which may be merely a nick or shallow groove between carrier 108'' and tapered valve section 326 of stem 312), and to chamber 130''. Thus, under those steady-state conditions, the pressures in chambers 128'' and 130'' are equal and carrier 108" is forced to the right, with a preselected force, by spring 118" to force valve 92 into engagement with seat 90" so as to seal chamber 130" from chamber 56".

It there is an abrupt decrease (the degree of required abruptness being selected by sizing orifice 324) in the absolute intake manifold pressure by an amount greater than the impeding force offered by spring 118", the transient pressure differential between chambers 130" and 128" forces the carrier 108" and the valve 92" to the left. After valve 92" has moved adequately clear of valve seat 90", further leftward movement is stopped by the engagement between collar 322 and tab 320. Carrier 108" may, however, continue to move to the left an additional distance with the effect of both opening orifice 324 and increasing the effective annular passageway between tapered portion 314 and bore 316, the tapering providing for modulation of the air flow and serving to prevent excess bleed to the intake manifold. By virtue of the air flow, and under the assumed conditions, air in chamber 56" flows through passageway 84", past valve 92" into chamber 130", through the now enlarge orifice 324, through the annulus between tpered section 314 and bore 316, into chamber 128" and thence through nipple 124" to the intake manifold of the engine. The pressures in chambers 130" and 56" rapidly equalized through valve 92", and as soon as orifice 324 is opened, the pressures of both rapidly reduce (absolute) towards the instant pressure in chamber 128". When the pressure differential between chambers 138" and 130" (and hence 56") reduces to a valve determined by spring 118", such as to 10 inches, spring 118" forces carrier 108" to the right to reclose orifice 324 and pilot valve 92".

That abrupt reduction in the pressure in chamber 56" results in the establishment of a pressure differential across diaphragm 44" in a sense to cause valve 30" to move from its closed to its diverting position, against the force of spring 50". Upon that event, and under the assumed conditions, air flows from chamber 54" through passageway 64", through calibrated orifice 68" and into chamber 56" to reduce the pressure differential on a time-delayed basis and when that pressure differential adequately reduces, spring 60" again restores the valve 30" to its illustrated closed position, the rate of restoration, after reclosing movement commences, also being controlled by orifice 68".

It will be observed when valve surface 308 of valve 30" is in engagement with valve seat 306 during the diverting operation, chamber 54" is isolated or effectively isolated from the pressure from the pump (as it appears in port 10"), so that the pressure in chamber 54" (which affects the rate of change of the pressure difference between chambers 54" and 56") reflects or varies as a function of tue outlet pressure of the utilization device or system, and in the presented example, that outlet pressure can or does reflect the exhaust manifold pressure of the internal combustion engine. The exhaust manifold pressure of the internal combustion engine in turn varies with or reflects the altitude of the vehicle.

In effect, in the illustrated embodiment the apparatus derives a pressure in chamber 56" which varies as a function of exhaust manifold back pressure, and controls the duration of the full-open operation of the valve 30" as a function of that difference, with change of exhaust manifold back pressure, which occurs in response to an increase of altitude, being used, in effect, to increase the time required for air to flow through orifice 68" sufficiently to change the pressure in chamber 56" to the valve at which the forces are in balance so that valve 30" initiates its reclosing movement. At higher altitudes, the duration of the fully open condition of valve 30" is much longer than that ocurring in response to the same intake-manifold-pressure-change signal at sea level. Further, when valve 30" first starts to move back to the right to open the valve constitued by the engagement of surfaces 308 and 306, the pressure in chamber 54" changes to the instant pressure in port 10" which also varies with variations in the altitude of the vehicle. From the time of that cracking of the valve 304–306 until valve 30" is fully reclosed, the rate of air flow through orifice 68" will be controlled by the difference in pressure between that pressure in chamber 54" and the pressure in chamber 56", so that the time required for chamber 56" to reach a value at which valve 30" is full reclosed will also vary as a function of altitude, again, in a sense such that the time required for that closing movement to be completed at a high altitude is greater than the time required for that full reclosure to occur at sea level, in response to the same intake-manifold-pressure-change signal. Thus, in the specific embodiment illustrated in FIG. 12, it is the total duration of the time from initial opening of valve 30" to full reclosing of valve 30" which is compensatorily modified as a function of the altitude of the vehicle so as to produce proper diverting action effectively independently of altitude changes. Obviously, it is not essential that both the changes of exhaust back pressure with altitude and the changes of pump pressure be effectively sensed or employed, nor essential that the total duration of the open time of valve 30" be adjusted in response to altitude changes.

Those skilled in the art will best understand the operation of the preferred embodiment by utilizing an example (in which all pressures are but illustrative, and are given in inches of mercury, positive or negitive, in relation to sea-level atmospheric pressure).

In an illustrative arrangement, the effective area of diaphragm 310 was 0.555 square inches, and the effective area of valve 90" was 0.025 square inches, for a net area of 0.53 square inches. The effective area of diaphragm 44" was 0.71 square inches and the effective area of valve 30", when closed as illustrated, was 0.40 square inches for a net effective area of 0.31 square inches. When valve surface 308 is in engagement with seat 306, its effective area is 0.74 square inches which, in relation to the effective area of diaphragm 44", is a net effective area of 0.03 square inches. Spring 118" has a force of 2.8 pounds while that of spring 60" is 1.5 pounds.

As one example, assume that the intake manifold pressure in chamber 128", and hence in chamber 130", is −15 inches, and that the pressure in port 10", and hence in chamber 54" and chamber 56", is +8 inches. Under that condition, there will be a net force of 3.26 pounds closing valve 30" against valve seat 26". Those pressures are but illustrative, but are assumed to reflect the conditions under road load at 50 mph at sea level.

If the driver, operating his vehicle at the above conditions at sea level, opens the throttle to accelerate the engine to initiate acceleration of the vehicle, there will be an abrupt rise in the absolute intake manifold pressure and the increase in engine speed will also increase the pump pressure in port 10''. Assuming that the operator has opened the throttle enough to produce a change of the pressure in chambers 128'' to −5 inches, the change is in the wrong direction to open pilot valve 92'', but chamber 130'' equalizes with chamber 128'' through orifice 324. Assuming also that under those conditions the pump pressure rises to +13 inches, with that pressure also existing in chambers 54''' and 56'', the net force will be 4.24 pounds, still in a closing direction. Thus the valve 30'' will remain closed, as illustrated.

Assuming that the operator then abruptly returns the throttle to a proper position to maintain road load at 50 miles an hour at sea level, the pressure in chamber 128'' will promptly restore to the −15 inch vlue. If, as is here assumed, the valve is set to respond to an abrupt 10 inch change in intake manifold pressure in the appropriate direction, pilot valve 92 will operate because, at the time of the reduction of the pressure in chamber 128'' to −15 inches, the pressure in chamber 130'' was, as noted in the previous paragraph, −5 inches, resulting in a pressure difference of the requisite 10 inches. As a result, carrier 108'' and valve 92'' will travel to the left, and the pressure in chambers 130'' and 56'' will become equal to one another and to a value of 10 inches below the instant pressure in chamber 128'', that is, in the assumed example, −5 inches, and pilot valve 92'' will reclose. Since acceleration of the engine is terminated, the pump pressure will have restored to its initially assumed value of "8 inches and that also will be the pressure in chamber 54''. Under these conditions, there will be a 13 inch pressure differential between chambers 54'' and 56'' and a net force of 0.84 pounds in an opening direction, that is, in direction to move valve 30'' to the left to terminate air flow to the utilization system and divert the pressure from the pump to port 24''. Of course, upon that diversion, the pressure at port 10'' will reduce, such as to +2 inches, as one example.

Because of the pressure differential between chambers 54'' and 56'', which is 13 inches, air will flow from chamber 54'' through calibrated orifice 68'' into chamber 56'', the rate of that flow being a function of the magnitude of the pressure difference. At an interim point under the assumed conditions, when the pressure in chamber 56'' has risen from the assumed −5 inches to −2.6 inches, the net force holding valve 30'' in its fully diverted position is zero and the pressure difference at that instant, between chambers 54'' and 56'' is 10.6 inches. Under the assumed conditions, the time required to reach that point of balance is very short. From that point on, the pressure in chamber 54'' reflects the pressure at port 10'' which also reflects altitude, and as air continues to flow through calibrated orifice 68'', valve 30'' moves towards its closed position at a rate determined by the pressure difference and the parameters of the system. During this movement, the pressure at port 10'' will rise (but still reflect altitude) as the valve closes, and this rise will be communicated to chamber 54'' since valve surface 308 is separated from seat 306. It will be observed that when the pressure at port 10'' rises to +4.3 inches, with that same pressure in chamber 54'', and with the forces at balance, the pressure in chamber 56'' will be atmospheric and the pressure difference between chambers 54'' and 56'' will be down to 4.3 inches.

Under the foregoing conditions, the total period of diverting action will be very short. For example, under the illustrative conditions presented, the valve will remain fully open for less than one-half second and will require about one and one-half seconds to move from its open to its fully closed position.

Under correlative operating conditions, but at 8000 feet, with the changes in exhaust manifold back pressure and pump pressure reflecting that altitude, valve 30'' will remain fully open for a substantially longer period, such as about 2 seconds and, illustrating the effect of sensing the change of pump pressure which occurs with altitude change, the time required for the valve to move from its open position to its fully closed position will also be longer such as, for example, 2½ seconds.

This capability of compensanting the overall system for changes in altitude, does not adversely affect the capability of the system to properly perform in response to varying intake manifold signals at a constant altitude. As an example, if there is an abrupt change (at sea level) of the intake manifold pressure in the correct direction and by an amount exceeding a preselected amount, the time that the valve is fully open and the time required for it to translate back to a fully closed position will be effectively constant independently of whether the change exceeds the preselected amount by just a bit or by a significantly larger amount.

It will also be appreciated that the arrangement of FIG. 12 is but representative, and shows the presently preferred way of varying the operation of the valve as a function of altitude. It is also contemplated that the fact of diversion rather than the duration of diversion may be controlled as a function of altitude. It is also contemplated that altitude could be sensed either directly or by sensing exhaust manifold back pressure or by sensing pump pressure, or a combination thereof, and employed to control a modulating valve for controlling the effective size of the bleed orifice 68''. It is also contemplated that the principles herein disclosed, or any of them, be used in valves for use in a bypass control arrangement, such as in substitution for valve 291 in FIG. 10, or in other control applications.

I claim:

1. The method of establishing a uniform effective orifice size in mass-produced fluid dynamic controlled devices which comprises the steps of forming a tapered elongated cavity in an external element, forming a cylindrical plug element having a major cross sectional comfiguration smaller than at least a first portion of the tapered cavity and larger than a second portion of the tapered cavity, forming a longitudinal discontinuity in one of the abutting faces of the cavity and the plug with the plug having an abutting face of substantially less axial length than that of the cavity, positioning the plug in said first portion of the cavity, placing a pushing tool in engagement with the plug and forcefully moving the tool to progressively forcefully insert the plug into the cavity to progressively physically distort one of the elements as a result of that progressive forceful insertion to effectively reduce the cross sectional size of that longitudinal discontinuity progressively during the progressive insertion, the angle of taper and materials used being such that said forceful insertion will cause the plug to become frictionally fixed in place in the cavity without the application of continued force, said plug element being imperforate so that said longitudinal discontinuity on said abutting face constitutes the sole orifice for communicating fluid longitudinally of said plug element, calibrating the size of the orifice as the plug is forcefully inserted within the cavity, and thereafter removing the pushing tool from the cavity.

2. The method according to claim 1, wherein the orifice is calibrated by forcing fluid under pressure through the orifice between the plug element and the wall of the cavity during the forceful insertion, and continuing the forceful insertion until the pressure between those orifices reaches a preselected value.

3. The method according to claim 1 wherein the orifice is calibrated by forcing fluid under pressure through the orifice between the plug element and the wall of the cavity during the forceful insertion, measuring a property of the fluid which will vary with a change in the size of said orifice, and continuing the forceful insertion until the measured property reaches a preselected value.

4. The method according to claim 1 wherein said external element and said plug element are formed of materials having a different hardness.

5. The method according to claim 1, wherein the physical distortion of said one of said elements results in said element taking a permanent set.

6. The method according to claim 1, wherein the physical distortion of said one of said elements includes an actual flow of the material thereof.

7. The method according to claim 1 wherein the coefficient of expansion of said external element is approximately the same as that of said plug element.

8. The method according to claim 1 wherein said longitudinal discontinuity is substantially uniform in cross-section from one end to the other.

9. The method according to claim 1 wherein said longitudinal discontinuity is formed in said plug element.

* * * * *

UNITED STATES PATENT OFFICE
CERTIFICATE OF CORRECTION

PATENT NO. : 3,995,356
DATED : December 7, 1976
INVENTOR(S) : William L. Sheppard It is certified that error appears in the above-identified patent and that said Letters Patent are hereby corrected as shown below:

Title Sheet, "13" drawings should be --12--

Column 4, line 24, after "unit" add --(--

Column 6, line 56, "pivot" should be --pilot--

Column 7, line 46, "open" should be --opens--

Column 9, line 24, "these" should be --those--

Column 10, line 36, "both" should be --body--

Column 10, line 66, "it" should be --is--

Column 11, line 13, after "valve" insert --seat--

Column 11, line 18, "it is" should be --if it--

Column 12, line 63, "aboveatmospheric" should be --above-atmospheric--

Column 14, line 52, "conbustion" should be --combustion--

Column 15, line 9, after "and" insert --which--

Column 15, line 33, after "art" insert --to--

Column 15, line 56, "32" should be --232--

Column 16, line 62, "279" should be --278--

Column 17, line 23, "product" should be --produce--

UNITED STATES PATENT OFFICE
CERTIFICATE OF CORRECTION

PATENT NO. : 3,995,356
DATED : December 7, 1976
INVENTOR(S) : William L. Sheppard It is certified that error appears in the above-identified patent and that said Letters Patent are hereby corrected as shown below:

Column 18, line 16, "resoldifies" should be --resolidifies--

Column 19, line 7, "publig" should be --public--

Column 21, line 20, delete "the valve to move its fully open to its fully closed position is modified,"

Column 21, line 23, "im" should be --in--

Column 21, line 61, "enlarge" should be --enlarged--

Column 22, line 26, "roadily" should be --readily--

Column 22, line 40, "." should be --; in the illustrated embodiment, nipple 124", secured to cap 120",--

Column 22, line 43, "chamber" should be --chambers--

Column 22, line 56, after "in" insert --the--

Column 23, line 20, "the" should be --that--

Column 23, line 23, "enlarge" should be --enlarged--

Column 23, line 24, "tpered" should be --tapered--

Column 23, line 56, "tue" should be --the--

Column 23, line 56, after "pressure" insert --in port 20". That outlet pressure does or can reflect the back pressure--

UNITED STATES PATENT AND TRADEMARK OFFICE
CERTIFICATE OF CORRECTION

PATENT NO. : 3,995,356
DATED : December 7, 1976
INVENTOR(S) : William L. Sheppard It is certified that error appears in the above-identified patent and that said Letters Patent are hereby corrected as shown below:

Column 23, line 64, after "56" insert --(after the pilot valve has been opened) which varies as a function of the instant intake manifold pressure, derives a pressure chamber in chamber 54"--

Column 24, line 4, "valve" should be --value--

Column 24, line 15, "304" should be --308--

Column 25, line 15, "vlue" should be --value--

Column 25, line 30, ""8" should be --+8--

Column 26, line 48, "comfiguration" should be --configuration--

Signed and Sealed this

Thirteenth Day of September 1977

[SEAL]

Attest:

RUTH C. MASON
Attesting Officer

LUTRELLE F. PARKER
Acting Commissioner of Patents and Trademarks